(12) United States Patent
Hoppe et al.

(10) Patent No.: US 8,293,059 B2
(45) Date of Patent: Oct. 23, 2012

(54) METHOD FOR GENERATING A GLASS CERAMIC COMPOSITE STRUCTURE

(75) Inventors: Bernd Hoppe, Ingelheim (DE); Evelin Weiss, Mainz (DE); Ralf Bonitz, Stadecken-Elsheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 12/941,262

(22) Filed: Nov. 8, 2010

(65) Prior Publication Data

US 2011/0091730 A1    Apr. 21, 2011

Related U.S. Application Data

(63) Continuation of application No. PCT/EP2009/003144, filed on Apr. 30, 2009.

(30) Foreign Application Priority Data

May 8, 2008    (DE) .......................... 10 2008 023 826

(51) Int. Cl.
  *B29C 65/00* (2006.01)
  *C03B 29/00* (2006.01)
  *B32B 9/00* (2006.01)

(52) U.S. Cl. ............... 156/272.2; 156/272.8; 156/89.11; 156/89.12; 428/428

(58) Field of Classification Search ............... 156/272.2, 156/272.8
  See application file for complete search history.

(56) References Cited

U.S. PATENT DOCUMENTS

| | | | |
|---|---|---|---|
| 3,120,433 A * | 2/1964 | Van Zee ............................ 65/43 |
| 3,459,569 A | 8/1969 | Ellis |
| 3,715,196 A | 2/1973 | Montierth |
| 3,885,942 A | 5/1975 | Moore |
| 4,011,093 A * | 3/1977 | Veres ............................... 501/64 |
| 4,076,513 A * | 2/1978 | Pei .................................. 65/33.5 |
| 4,158,485 A | 6/1979 | Mueller et al. |
| 4,354,717 A | 10/1982 | Rech et al. |
| 6,369,351 B1 | 4/2002 | Hesener |
| 6,558,494 B1 | 5/2003 | Wang et al. |
| 6,843,073 B2 * | 1/2005 | Fotheringham et al. ........ 65/33.2 |
| 7,000,430 B1 | 2/2006 | Fotheringham et al. |
| 7,017,370 B1 | 3/2006 | Fotheringham et al. |
| 2003/0222061 A1 | 12/2003 | Langer et al. |
| 2005/0014008 A1 * | 1/2005 | Gille et al. ..................... 428/432 |
| 2007/0075643 A1 * | 4/2007 | Bhosale et al. ................ 313/636 |
| 2007/0246156 A1 | 10/2007 | Kohlmann et al. |
| 2008/0227616 A1 | 9/2008 | Peuchert et al. |

FOREIGN PATENT DOCUMENTS

| | | |
|---|---|---|
| DE | 1 596 956 | 9/1971 |
| DE | 25 05 513 | 8/1976 |
| DE | 27 13 611 | 10/1978 |
| DE | 198 21 679 A1 | 11/1999 |

(Continued)

*Primary Examiner* — Philip Tucker
*Assistant Examiner* — Alex Efta
(74) *Attorney, Agent, or Firm* — Harness, Dickey & Pierce, P.L.C.

(57) ABSTRACT

A method for making glass ceramic composite structures, wherein a first and at least a second glass component, with an intermediate layer of a joining solder consisting of glass placed between them, are assembled to form a raw composite structure, wherein the joining solder has a radiation absorption capacity higher than the components to be joined, and wherein the raw composite structure is irradiated with energy, for example IR energy, at least in the area of the joining solder until the joining solder has softened sufficiently to bond together the components and the joining solder to produce a composite glassy structure. Thereafter a ceramization treatment is performed.

15 Claims, 4 Drawing Sheets

FOREIGN PATENT DOCUMENTS

| | | |
|---|---|---|
| DE | 198 39 343 A1 | 3/2000 |
| DE | 102 19 951 A1 | 11/2003 |
| DE | 20 2004 009 227 U1 | 11/2005 |
| DE | 10 2005 047 006 A1 | 4/2007 |
| JP | 63-319230 A | 12/1988 |
| JP | 2005-61747 | 3/2005 |
| WO | WO 2006/034775 A1 | 9/2005 |
| WO | WO 2006/034835 A1 | 4/2006 |

\* cited by examiner

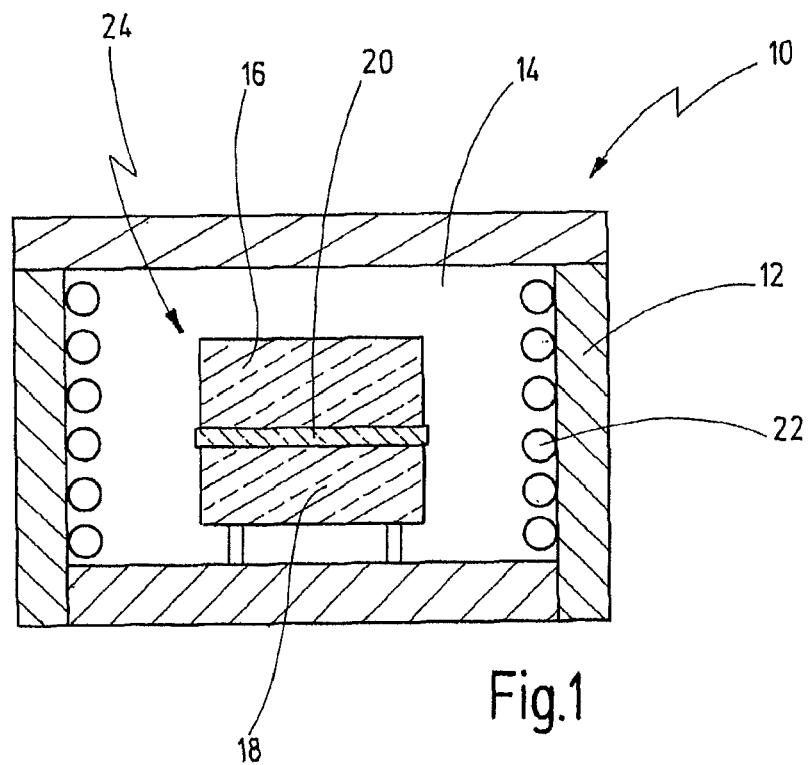
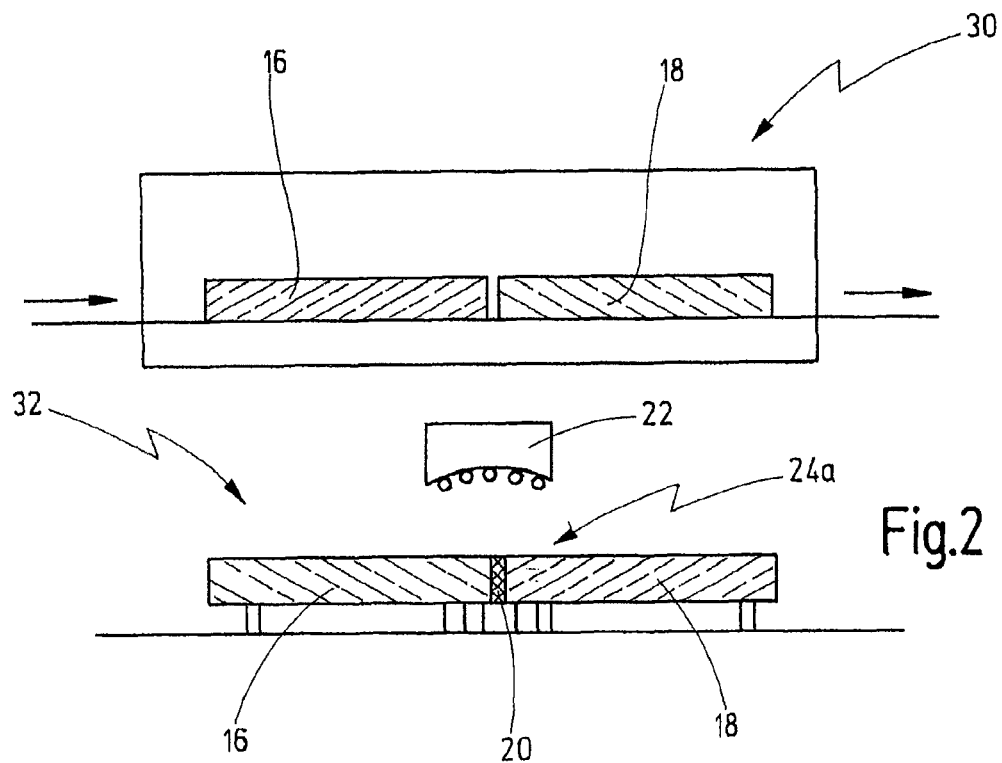

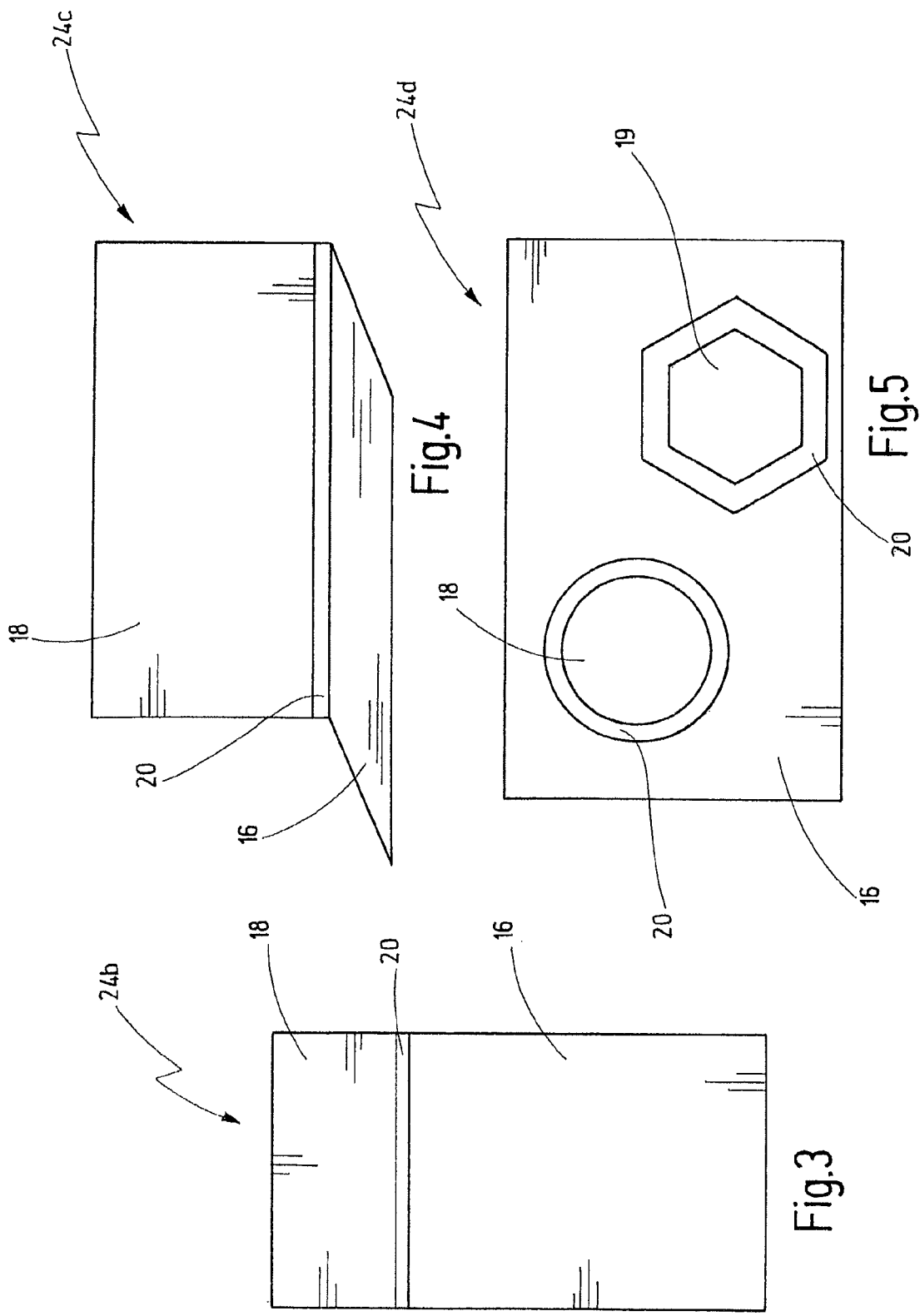

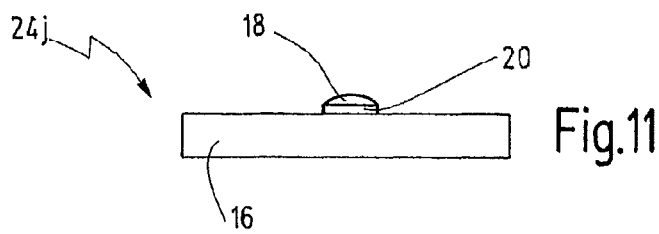
Fig.11
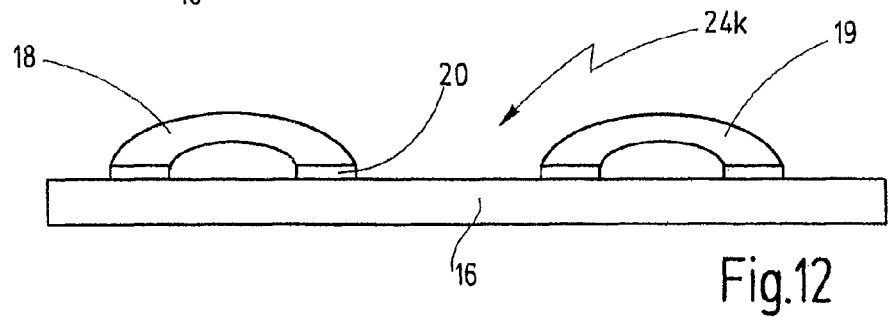
Fig.12
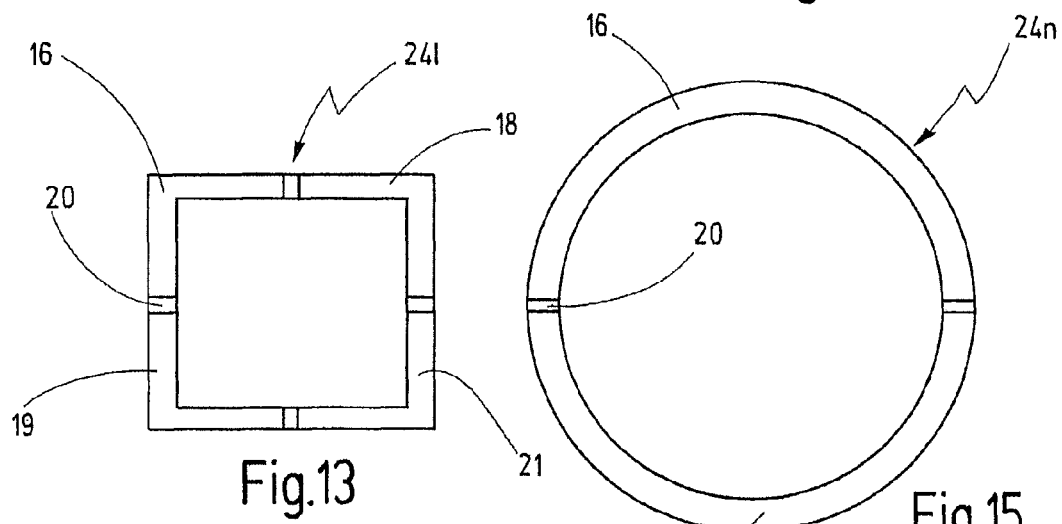
Fig.13
Fig.15
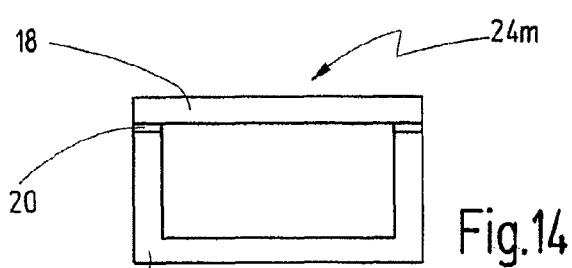
Fig.14
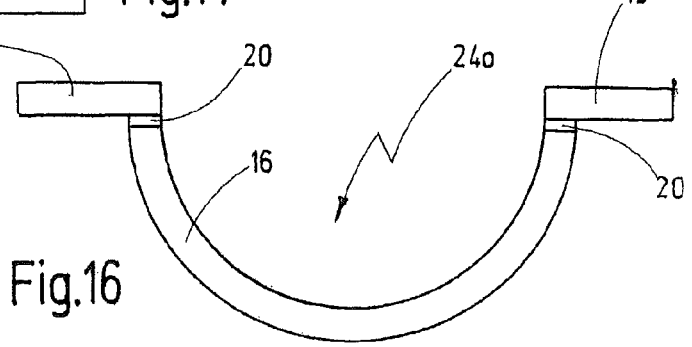
Fig.16

METHOD FOR GENERATING A GLASS CERAMIC COMPOSITE STRUCTURE

CROSS REFERENCES TO RELATED APPLICATIONS

This application is a continuation of international patent application PCT/EP2009/003144, filed on Apr. 30, 2009 designating the U.S., which international patent application has been published in English language and claims priority from German patent application 10 2008 023 826.0, filed on May 8, 2008. The entire contents of these priority applications are incorporated herein by reference.

BACKGROUND OF THE INVENTION

The present invention relates to a method for generating a glass ceramic composite structure.

A method for producing a composite structure consisting of a zero-expansion material, and a method for producing the same, are known from WO 2006/034775 A1.

That publication describes different components, consisting of a zero-expansion material, for example of a LAS glass ceramic, that are bonded together by at least one adhesive layer. Any disadvantages are to be kept as small as possible by keeping the adhesive layer used as thin as possible. However, such a bond of course does not stand high temperatures and in addition has relatively low stability. Also, the advantageous properties of the zero-expansion materials are influenced detrimentally.

DE 198 21 679 A1 discloses a method for joining fiber-reinforced glass or glass ceramic materials to other materials, such as ceramic materials, where the glass or glass ceramic materials and the other materials are pressed together at a boundary surface between the two materials at high temperatures to form a heat fusion joint. The hot-pressing operation is intended to improve the joint.

A disadvantage of that method is seen in the relatively high expense connected with the hot-pressing operation. Further, pressing can be realized only with difficulty in the case of large components. Finally, the strength of the joint so produced is limited.

According to JP 63319230 a bonding material used for joining components made from glass or glass ceramics consists of a mixture of glass powder having a low softening point and a glass powder having a higher softening point, and the powder mixture serves as a joining partner between the components which is subsequently solidified by sintering and subjected to a crystallization treatment.

This process is relatively expensive, and still does not yield a high-strength joint due to the sintering process.

According to JP 2005061747 a plurality of components made from glass that are to be bonded together, are softened in a furnace and fused so that they are bonded one to the other. The structure so obtained is then heat-treated and crystallized.

Similarly, US 2005/0014008 A1 provides that a plurality of components made from glass that are to be bonded together, are initially joined by welding in their green glass condition and are then ceramized.

In order to do so, the edges of the two components must be heated up to a temperature far above the softening point, and this purposefully at the same time and homogeneously over their full length, in order to ensure that a strong bond is achieved when the two edges are pressed together. This is extremely difficult, especially in the case of long joining edges. In addition, there is only little time (in the order of seconds) available to complete the joining operation before the undesirable ceramization process of the green glass components begins.

For joining glass ceramics, there have also been known cementation processes of the type described, for example, by U.S. Pat. No. 3,715,196.

In that case, the strength of the bond depends on the adherence of the cement and its mechanical properties. And there is no real zero-expansion cement that would be capable of bonding together two glass ceramic materials with zero-expansion characteristics. Moreover, such a bond as a rule does not stand the high thermal stresses which normally would be tolerated by glass ceramic materials.

SUMMARY OF THE INVENTION

Accordingly, it is a first object of the present invention to disclose a method for generating a glass ceramic composite structure having high-strength and durable bonding of the individual components.

It is a second object of the present invention to disclose a method for generating a glass ceramic composite structure having a high degree of hermetic tightness of the bond between the components.

It is a third object of the present invention to disclose a method for generating a glass ceramic composite structure wherein the bond is highly temperature resistant.

It is a fourth object of the present invention to disclose a method for generating a glass ceramic composite structure wherein the composite structure produced has essentially the same material properties which a monolithic component would have.

These and other objects of the invention are achieved by a method for joining components made from glass based materials, wherein a first and at least a second component, with an intermediate layer of a joining solder placed between them, are assembled to form a raw composite structure, where the joining solder has a radiation absorption capacity higher than the components to be joined, and wherein the raw composite structure is irradiated with radiation energy at least in the area of the joining solder until the joining solder has softened sufficiently to bond together the components and the joining solder to produce a composite structure, wherein the components and the joining solder are made from glasses that can be transformed by heat treatment into glass ceramics, and wherein the composite structure is formed from the base glass components and the glass joining solder into a glassy composite structure and is ceramized thereafter.

The invention is further achieved by a composite structure comprising at least one first and one second component, made from glass ceramics, preferably from LAS glass ceramics, that are bonded one with the other via a joining solder consisting of a glass ceramic, the joining solder having a higher radiation absorption capacity than the first and the second components.

The invention thereby allows a high-strength and durable bond to be achieved in a simple way between a plurality of components made from glass or glass ceramics, where the properties of the bond produced largely correspond to the properties of the different components, so that high overall strength is achieved and the thermal coefficient of expansion is not impaired, especially when zero-expansion materials are used, for example.

Further, it is possible to achieve a high-temperature resistant bond, largely designed for a maximum application temperature corresponding to the maximum application temperature of the components that have been bonded together.

Since according to the invention the components to be bonded as well as the joining solder are used in its green glass condition to obtain a composite structure which is ceramized thereafter, any cracking can be avoided which would evolve, if one or more of the components would be ceramized before joining.

As the bond produced using a joining solder is obtained by application of radiation energy and local softening and/or fusing of the joining solder, the method so realized is very efficient and energy-saving. Due to the higher radiation absorption capacity of the joining solder, compared with the radiation absorption capacity of the components to be bonded together, softening of the components to be bonded together during softening or fusing of the joining solder can be avoided. As a result, high-strength and dimensionally stable composite structures can be produced.

Further, the method generally is also suited for bonding together larger components.

Finally, according to the invention an efficient bonding between glass ceramic components is made possible. The composite structure may have the same properties that have the individual components have.

E.g. the components to be bonded may consist of a zero-expansion material such as Zerodur® (a LAS glass ceramic produced by Schott AG, Germany). In this application a zero-expansion material is regarded as a material having a CTE (coefficient of thermal expansion) which is close to zero (smaller than $\pm 1 \cdot 10^{-6}$/K) in the application range of, for example, 0° C. to 50° C. More specifically, CTE is smaller than $\pm 0.5 \cdot 10^{-6}$/K ist, in particular smaller than $\pm 0.1 \cdot 10^{-6}$/K ist, in particular smaller than $\pm 0.05 \cdot 10^{-6}$/K ist, more particularly smaller than $\pm 0.02 \cdot 10^{-6}$/K ist. Also the composite ceramic structure may have essentially the same CTE.

The invention is applicable to any kind of glass ceramics, also to other known zero-expansion LAS glass ceramics such as CERAN®, Clearceram® and ROBAX® (all produced by Schott AG, Germany). Also MAS (magnesium aluminosilicate) glass ceramics may be of interest.

According to another embodiment of the invention, the joining solder has a higher radiation absorption capacity at least in the UV range, in the visible light range, in the IR range, or in the microwave range. Accordingly, irradiation can be effected using UV radiation, visible light, IR radiation, microwave radiation or laser radiation.

Advantageously, the joining solder is placed between the components to be bonded together in the form of a thin plate or a thin bar.

According to another embodiment of the invention, the joining solder used is a glass that absorbs in the infrared range, preferably a LAS glass ceramic containing components that absorb in the IR range (essentially coloring constituents), used in its green glass condition.

The absorbing components may be selected, individually or in combination, from the group comprised of Co, Fe, Mn, Ni, Cr, Sn, Ti, Zn, V, Nb, Au, Ag, Cu, Mo, Rh, Dy, Pr, Nd, Ce, Eu, Tm, Er, and Yb.

Preferably, the joining solder used is one that has a cumulative content of absorbing constituents of at least 0.1% by weight, preferably at least 0.2% by weight, more preferably at least 0.3% by weight, most preferably at least 0.4% by weight. Preferably, the maximum may be 5% by weight, or 2% by weight, or 1% by weight.

It is possible in this way to obtain an infrared absorption capacity of the joining solder sufficiently high to ensure that during heating-up of the composite structure using infrared radiation only the joining solder will be softened to bond together the components, while the components to be bonded together will not soften and not be altered essentially with respect to their dimensions.

For producing the infrared energy, an IR heater unit is used according to an advantageous further development of the invention.

The heater unit may be a heater unit with IR heating elements that produce a radiation temperature of 1500 K, preferably at least 2000 K, more preferably at least 2700 K, most preferably at least 3000 K, as is generally known from U.S. Pat. No. 7,000,430 B1 or U.S. Pat. No. 7,017,370 B1.

By using a heater unit with specified radiator temperature it is possible to produce short-wave infrared radiation to which the joining solder will couple especially efficiently to ensure quick heating-up of the joining solder, within the shortest possible period of time, whereas the components to be bonded together will not be excessively heated up so that dimensional alteration due to softening will be avoided.

The components to be joined may, for example, consist of a LAS (lithium aluminosilicate) glass ceramic that comprises a base glass having the following components (in wt.-% on oxide basis):

| | |
|---|---|
| $Li_2O$ | 2-5 |
| $Al_2O_3$ | 18-28 |
| $SiO_2$ | 50-70, | wherein the joining solder comprises (in wt.-%):

| | |
|---|---|
| $Li_2O$ | 2-5 |
| $Al_2O_3$ | 18-28 |
| $SiO_2$ | 50-70 |
| absorbing componets | 0.1-5. |

More specifically, the components may consist of a base glass comprising the following components (in wt.-% on oxide basis):

| | |
|---|---|
| $SiO_2$ | 50-70 |
| $Al_2O_3$ | 18-28 |
| $Li_2O$ | 2-5 |
| $Na_2O$ | 0-3 |
| $K_2O$ | 0-3 |
| MgO | 0-3 |
| CaO | 0-3 |
| SrO | 0-3 |
| BaO | 0-4 |
| ZnO | 0-3 |
| $TiO_2$ | 0-6 |
| $ZrO_2$ | 0-4 |
| $SnO_2$ | 0-2 |
| $\Sigma TiO_2 + ZrO_2 + SnO_2$ | 2.5-6 |
| $P_2O_5$ | 0-8 |
| F | 0-1 |
| $B_2O_3$ | 0-2 |
| refining agents | 0-2. |

The refining agents such as be $As_2O_3$, $Sb_2O_3$, SnO2, may usually be present in amounts of at least 0.1 wt.-%.

The joining solder may preferably comprise the same base glass to which further 0.1 to 2 wt.-% of coloring oxides are added.

According to an advantageous further development of the invention, the components are pre-heated preferably to a temperature above the glass transformation temperature $T_g$ before the raw composite structure is irradiated.

When larger components are to be joined it is possible in this way to avoid any disadvantageous effects due to thermal stresses that may result when the joining solder is heated up locally by irradiation energy.

Especially when larger components are to be bonded together, thermal stresses can be reduced in this way.

The method according to the invention is also suited for the production of structures of a more complex nature, composed from a plurality of individual components by a series of successive steps.

For example, a first composite structure, produced by irradiation from at least one first and at least one second component and an intermediate layer of joining solder, may be joined via an intermediate layer of joining solder with another component to form another raw composite structure, whereafter the joining solder may be irradiated until it has sufficiently softened to bond the components together.

It is easily possible in this way to produce even complex components for forming three-dimensional structures. These may be glass ceramic baking ovens, mirror bases, fireplace shields, architectural paneling, etc.

According to an advantageous further development of the invention, the first composite structure is initially pre-heated to a temperature above $T_g$ before the joining solder with at least one further component is irradiated with infrared energy.

One avoids in this way stresses that may occur especially in larger components.

It is understood that the features of the invention mentioned above and those yet to be explained below can be used not only in the respective combination indicated, but also in other combinations or in isolation, without leaving the scope of the invention.

Ceramization is always effected after bonding of the joining solder. So the components and the joining solder are used in its green glass condition and are ceramized only after the bonding process.

A typical heating cycle to effect bonding, for an LAS base glass, for example, would be:
- pre-heating to a pre-heating temperature of at least 600° C.;
- heating the joining solder by IR radiation within less than 1 minute, preferably within a maximum of 30 seconds, to a bonding temperature of the joining solder, preferably to 1100° C. to 1350° C.;
- holding at the bonding temperature up to a maximum of 120 seconds, preferably for 5 to 60 seconds, to effect bonding of the composite structure; and
- cooling thereafter.

Preferably, the composite structure is cooled to a temperature below ceramization temperature within less than 10 minutes, preferably is cooled below 750° C. within 1 to 5 minutes.

Thereafter a typical ceramization cycle may be started. This may involve, for example, heating the composite structure to a nucleation temperature of 750° C., holding for 1 hour, heating to 900° C. holding for 1 hour and cooling to room temperature thereafter.

BRIEF DESCRIPTION OF THE DRAWINGS

Further features and advantages of the invention will be apparent from the description that follows of certain preferred embodiments, with reference to the drawing. In the drawings FIG. 1 shows an IR heater unit in which two components that are to be bonded together, and an intermediate layer of a joining solder can be irradiated with infrared energy;

FIG. 2 shows a roller-type heating furnace for pre-heating two components to be bonded together, followed by an IR heating station for subsequently bonding the preheated components with the intermediate layer of a joining solder using infrared energy; and FIGS. 3-16 show different applications of the method according to the invention for different glass ceramic components, joined in each case by a joining solder.

DETAILED DESCRIPTION OF THE PREFERRED EMBODIMENTS

Figure 6:
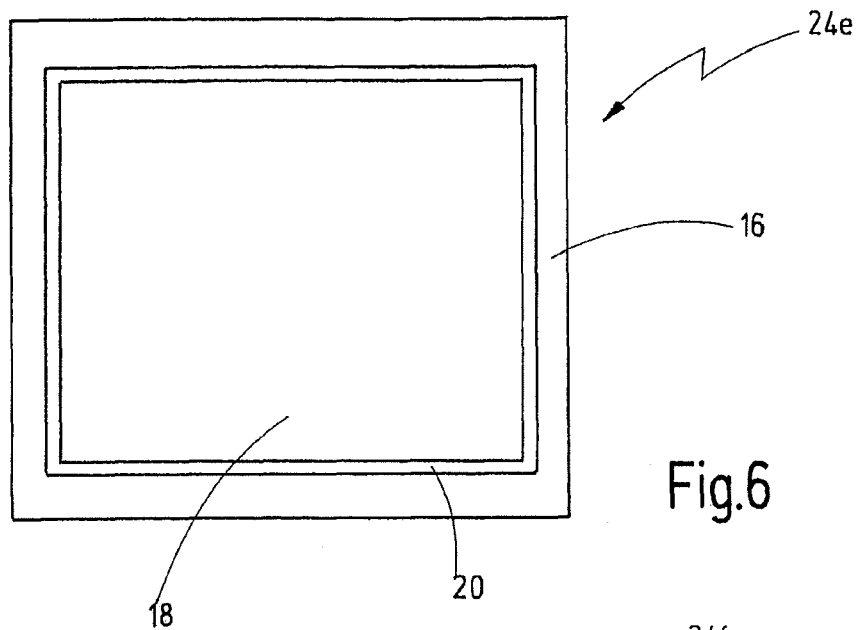
Figure 7:
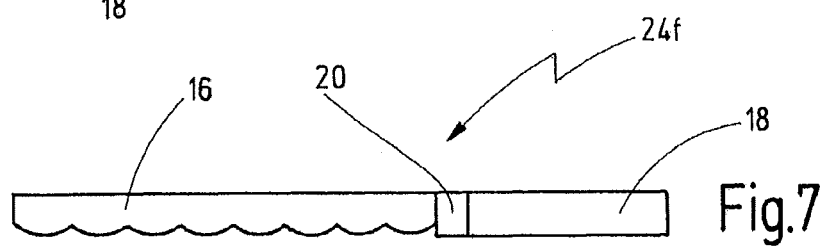
Figure 8:
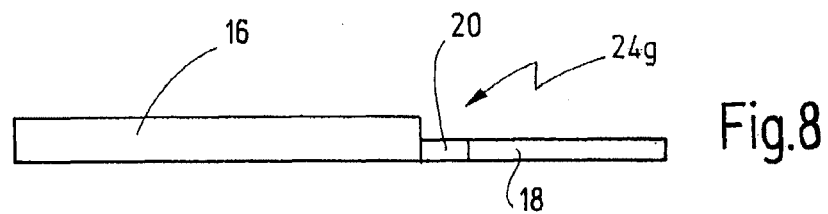
Figure 9:
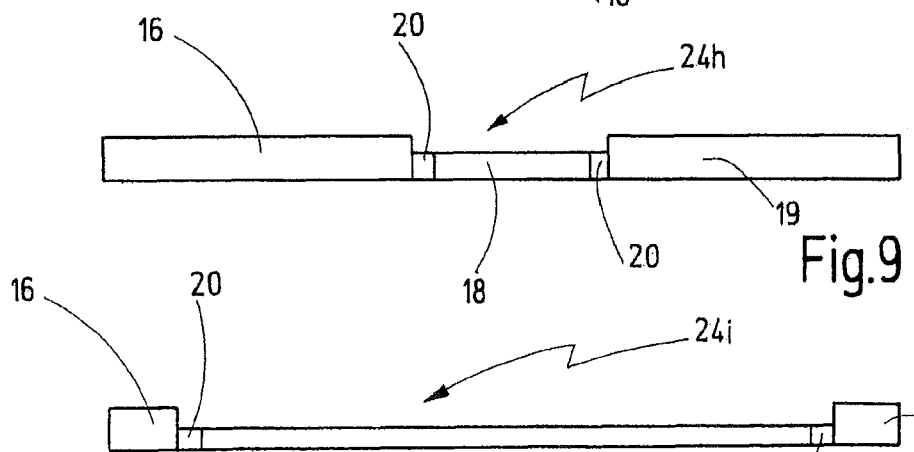
Figure 10:

FIG. 1 shows, by way of a diagrammatic representation, an infrared heater unit (IR heater unit) 10 in which two components 16, 18, made from glass or glass ceramics, with an intermediate layer of a joining solder 20 in the form of a thin glass plate, can be bonded together.

The IR heater unit 10 may be an IR heater unit of the kind known from U.S. Pat. Nos. 7,000,430 B1 or 7,017,370 B1, both of which are integrated herein in full by reference.

The heaters used may be quartz radiators, for example, which have a color temperature of 3000 K and a radiation maximum in the range of approximately 960 nm. The greatest part of the emitted radiation is in the range of between 500 and 5000 nm.

The components to be bonded together, for example two plates 16, 18 made from a LAS glass ceramic, are loaded into the interior 14 of the IR heater unit 10 preferably in green glass condition together with an intermediate layer of a joining solder 20 in the form of a thin plate. The joining solder 20 may for example also consist of a LAS glass ceramic material containing highly absorbing constituents whereby high infrared absorption is achieved.

The raw composite structure so formed is then irradiated with the infrared energy emitted by the quartz radiators 22 of the IR unit until the joining solder 20 has softened sufficiently to bond the two components 16, 18 together. The two components 16, 18 are fused at their boundary surfaces to the joining solder 20, the latter having been heated up to a higher temperature, so that the effect of gravity leads to a substance bond.

Heating up may be carried out within a short period of time of, for example, 30 seconds and may be followed by a cooling-down phase caused by switching off the heater elements or by a well-directed cooling-down process, in order to reduce stresses.

Preferably, the components 16, 18 to be joined and the joining solder 20 are used in green glass condition, and the composite structure so produced is subsequently ceramized, for example in a roller conveyor furnace.

Especially when larger components are to be bonded together, the method which will be described hereafter with reference to FIG. 2 may be an obvious choice.

In that case, the components 16, 18 to be bonded together can be heated up in a furnace 30, for example a roller conveyor furnace, to a temperature clearly higher than the glass transformation temperature $T_g$, and can then be heated up locally, substantially in the area of the joining solder 20, by an IR heater unit 22 in an IR heating station 32 until the joining solder 20 has softened sufficiently to bond the components 16, 18 together.

Heating up the components 16, 18 in this way is recommendable in order to avoid high stresses that may result when the joining solder 20 is heated up locally.

Due to the poor thermal conductivity of glass, initial heating-up to a temperature clearly above $T_g$, for example to 750°

C., will be sufficient to avoid excessively high stresses during the subsequent bonding operation using infrared energy.

If necessary, the IR heating station 32 may be additionally enclosed by a conventional furnace to generally guarantee more uniform heating-up and to keep the components at a temperature above $T_g$ during the bonding operation.

The invention is further suited for producing three-dimensional components for complex structures, also by a plurality of successive steps.

Different applications will be briefly described hereafter with reference to FIGS. 3 to 16.

A composite structure 24b according to FIG. 3, or 24c according to FIG. 4, comprises for example a first component 16 and a second component 18 made from glass ceramics of different coloring, that are to be bonded together using a joining solder 20.

According to FIG. 5, a composite structure 24d comprises a first component in the form of a glass ceramic plate on which a second glass ceramic component 18 of circular shape and a third component 19 of hexagonal shape are placed using respective intermediate layers of a joining solder 20.

According to FIG. 6, a composite structure 24e comprises a first component 16 made from glass ceramics and a second component 18 made from glass ceramics, that are bonded together in the way of a frame via an intermediate layer of a joining solder 20.

According to FIGS. 7 to 10, a composite structure 24f in the form of a panel is formed from a first glass ceramic component 16 with a structured bottom surface and a second component 18 with a smooth bottom surface, with an intermediate layer of a joining solder 20, and/or a composite structure 24g in the form of a panel is formed comprising two glass ceramic components 16, 18 with smooth bottom surfaces, but different thicknesses, and/or a composite structure 24h in the form of a channel is formed from three glass ceramic components 16, 18, 19 with smooth bottom surfaces but different thicknesses, and/or a composite structure 24i in the form of a tray is formed from three glass ceramic components 16, 18, 19 with smooth bottom surfaces, in each case with an intermediate layer of a joining solder 20.

FIG. 11 shows a composite structure 24j in the form of a web, FIG. 12 shows a composite structure 24k in the form of a pot holder. A first component 16 has the form of a glass ceramic plate on which two circular plates 18, 19 are placed via intermediate layers of a joining solder 20.

FIG. 13 shows a closed composite structure 24l consisting of components 16, 18, 19, 21 which, together with the respective intermediate layers of a joining solder 20, supplement each other so as to form together a structure of square or rectangular cross-section. Production is effected in a plurality of successive steps. A first raw composite structure and a second raw composite structure are formed from the components 16, 18 and the intermediate layer of joining solder 20 and from the components 19, 21 and the intermediate layer of joining solder 20, respectively. The two raw composite structures, with the intermediate layers of joining solder 20, are then bonded together to form the composite structure 24l. The overall composite structure may, for example, be a tube for a glass ceramic baking oven or a closed fireplace insert made from glass ceramics.

FIG. 14 shows another application with a composite structure 24m of closed rectangular form made from a U-shaped component 16 and a plate-shaped component 18 with an intermediate layer of a joining solder.

FIGS. 15 and 16 show composite structures 24n or 24o in cylinder form or in semi-cylinder form, respectively, with attached flat marginal portions 18, 19.

Preferably, the components to be bonded together are bonded under the effect of gravity.

EXAMPLE 1

The components to be bonded consist of two rectangular plates of Robax®, a LAS glass ceramic material sold by Schott AG under Ref. No. 8721. The joining solder used is a highly IR absorbing glass ceramic material which is sold by Schott AG under the name Ceran-Color® under Ref. No. 8557. The components to be bonded together, in the form of plates measuring 250×150 mm, with an intermediate layer of joining solder consisting of Ceran-Color® in the form of a plate of 1 mm thickness, were placed in an IR heater unit one above the other and were then heated up for a period of 40 seconds. Ceran-Color® is a LAS glass ceramic material containing Co, Fe Mn and Ni in concentrations of between 0.1 and 0.3% by weight, respectively, which means that the total content of coloring constituents is between 0.4 and 1.2% by weight.

After having cooled down, the two components are joined to a composite structure via a substance bond produced by the joining solder.

Both the components to be bonded together and the joining solder were used in green glass condition, and the composite structure produced was subsequently ceramized by a suitable temperature treatment, e.g. heating to 750° C., holding for 1 hour, heating to 900° C., holding for 1 hour and cooling to room temperature. The composite structure so produced may be used, for example, as a fireplace shield.

EXAMPLE 2

Two components that were to be bonded together, made from Clertrans®, a material sold by Schott AG under Ref. No. 8724, were joined using CeranColor® as a joining solder under otherwise identical conditions as in Example 1.

EXAMPLE 3

Two components made from Suprema® LAS glass ceramic, a material sold by Schott AG under Ref. No. 8701, were bonded together using an intermediate layer of a joining solder consisting of Ceran-Hightrans®, a material sold by Schott AG under Ref. No. 8575, under otherwise identical conditions as in Example 1. CeranHightrans® is an LAS glass ceramic material containing vanadium as a coloring constituent in a proportion of between 0.4 and 1.2% by weight. The composite structure so produced may be employed especially for ceramic hobs.

What is claimed is:

1. A method for joining components from glass based materials, comprising the steps of:
providing a first component and at least a second component, both made from glasses that can be transformed by heat treatment into glass ceramics;
providing a joining solder made of a glass that can be transformed by heat treatment into a glass ceramic;
wherein said joining solder has a radiation absorption capacity higher than that of said first and second components to be joined;
placing an intermediate layer of said joining solder between said first and second components, thereby forming a raw composite structure;
irradiating said raw composite structure with radiation energy at least in a region wherein said joining solder extends between said first and second components until said joining solder softens sufficiently to bond together said first and second components and said joining solder for producing a composite structure; and thereafter ceramizing said composite structure, wherein said first and second components consist of LAS glasses and are pre-heated to a pre-heating temperature of at least 600° C., wherein said joining solder is heated by IR radiation within less than 1 minute to a bonding temperature of the joining solder in the range of 1100° C. to 1350° C., is held at said bonding temperature up to a maximum of 120 seconds to effect bonding of the composite structure, and is cooled thereafter.

2. The method of claim 1, wherein said joining solder has a radiation absorption capacity which is higher than said absorption capacity of said first and second components at least in a range selected from the group consisting of ultraviolet rays, visible rays, the infrared rays and microwave rays.

3. The method of claim 1, wherein irradiation is effected using radiation selected from the group consisting of ultraviolet radiation, visible light, microwave radiation and laser radiation.

4. The method of claim 1, wherein said first and second components to be bonded together consist of lithium aluminosilicate glasses in a glassy green glass condition that are transformed into lithium aluminosilicate glass ceramics (LAS glass ceramics) in the ceramizing step.

5. The method of claim 1, wherein a joining solder is used which is a glass that absorbs in the infrared range.

6. The method of claim 1, wherein a joining solder is used which substantially comprises the same glass components as said first and second components to be joined, and wherein said joining solder further comprises components that absorb more strongly infrared radiation than do said first and second components.

7. The method of claim 1, wherein a joining solder is used comprising at least one absorbing component being selected from the group consisting of oxides of Co, Fe, Mn, Ni, Cr, Sn, Ti, Zn, V, Nb, Au, Ag, Cu, Mo, Rh, Dy, Pr, Nd, Ce, Eu, Tm, Er, and Yb.

8. The method of claim 1, wherein a joining solder is used that has a cumulative content of absorbing component of at least 0.1% by weight and a maximum cumulative content of absorbing component of 5% by weight.

9. The method of claim 1, wherein said first and second components consist of a base glass comprising the following components (in wt.-% on oxide basis):

| | |
|---|---|
| $SiO_2$ | 50-70 |
| $Al_2O_3$ | 18-28 |
| $Li_2O$ | 2-5 |
| $Na_2O$ | 0-3 |
| $K_2O$ | 0-3 |
| MgO | 0-3 |
| CaO | 0-3 |
| SrO | 0-3 |
| BaO | 0-4 |
| ZnO | 0-3 |
| $TiO_2$ | 0-6 |
| $ZrO_2$ | 0-4 |
| $SnO_2$ | 0-2 |
| $\Sigma TiO_2 + ZrO_2 + SnO_2$ | 2.5-6 |
| $P_2O_5$ | 0-8 |
| F | 0-1 |
| $B_2O_3$ | 0-2 |
| refining agents | 0-2, | and wherein said joining solder further comprises 0.1 to 2 wt.-% of coloring oxides.

10. The method of claim 1, wherein for producing the infrared energy an IR heater unit is used having a radiation temperature of at least 1500 K.

11. The method of claim 1, wherein said first and second components are pre-heated to a temperature above their glass transformation temperatures $T_g$, before the raw composite structure is irradiated.

12. The method of claim 1, wherein said composite structure is cooled to a temperature below its ceramization temperature within less than 10 minutes.

13. The method of claim 1, wherein said first and second components have first and second glass transition temperatures, and wherein said composite structure after irradiating is at least cooled to a temperature which is equal to or lower than said glass transition temperatures $T_g$ of said first and second components, before ceramizing is started.

14. The method of claim 1, wherein a first composite structure, produced by irradiation from at least one first and one second component and an intermediate layer of joining solder, is joined with another component via an intermediate layer of joining solder to form another raw composite structure, whereafter the joining solder is irradiated until said joining solder has sufficiently softened to bond the components together.

15. The method of claim 1, wherein said first and second components to be bonded together consist of a zero-expansion material.

* * * * *